Figures 1, 4:
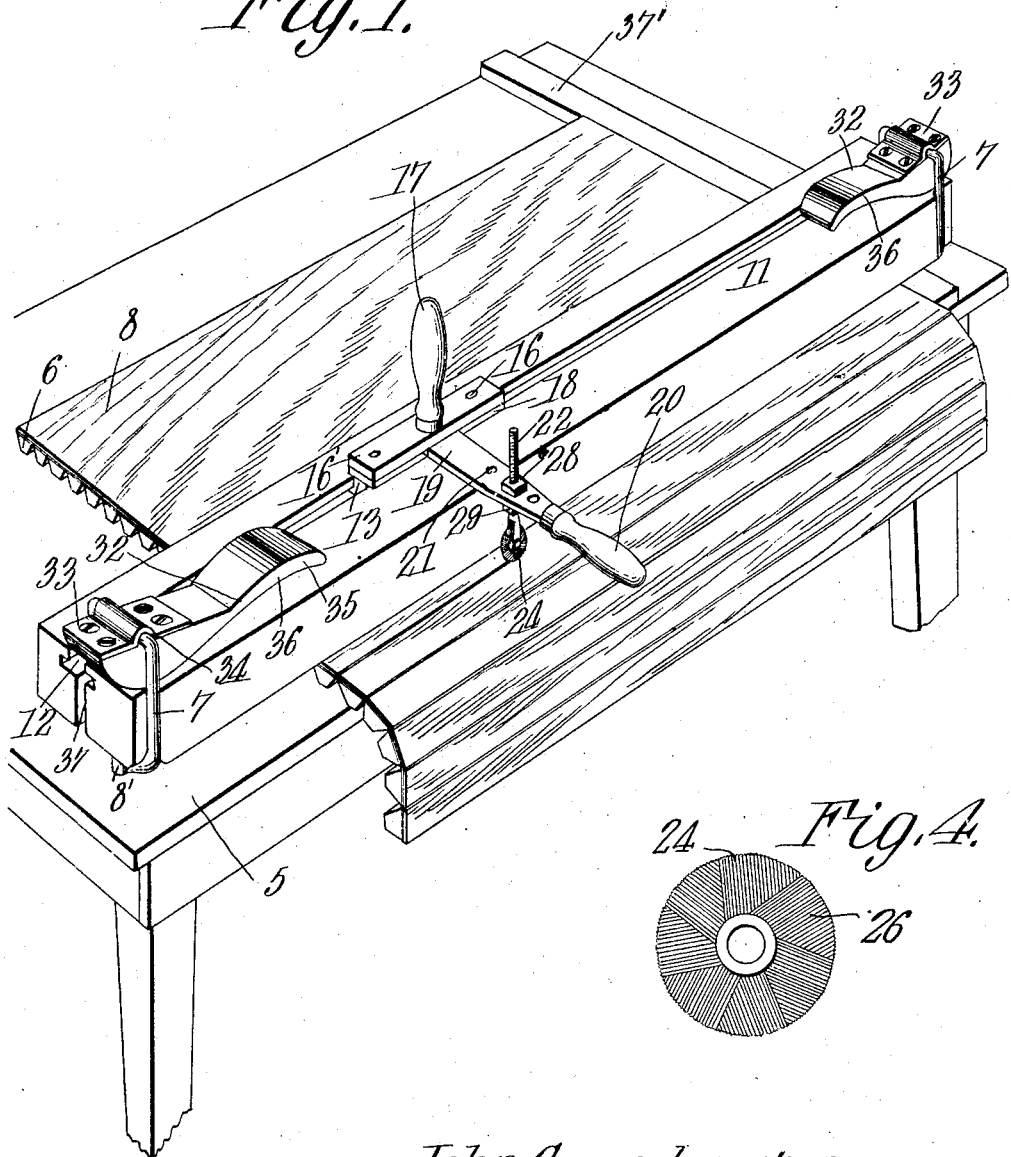

No. 868,656. PATENTED OCT. 22, 1907.
J. GRAMELSPACHER.
MACHINE FOR CUTTING FLEXIBLE ROLL CURTAINS.
APPLICATION FILED MAR. 11, 1907.

2 SHEETS—SHEET 1.

WITNESSES:

John Gramelspacher, INVENTOR.

By C.A. Snow & Co.
ATTORNEYS

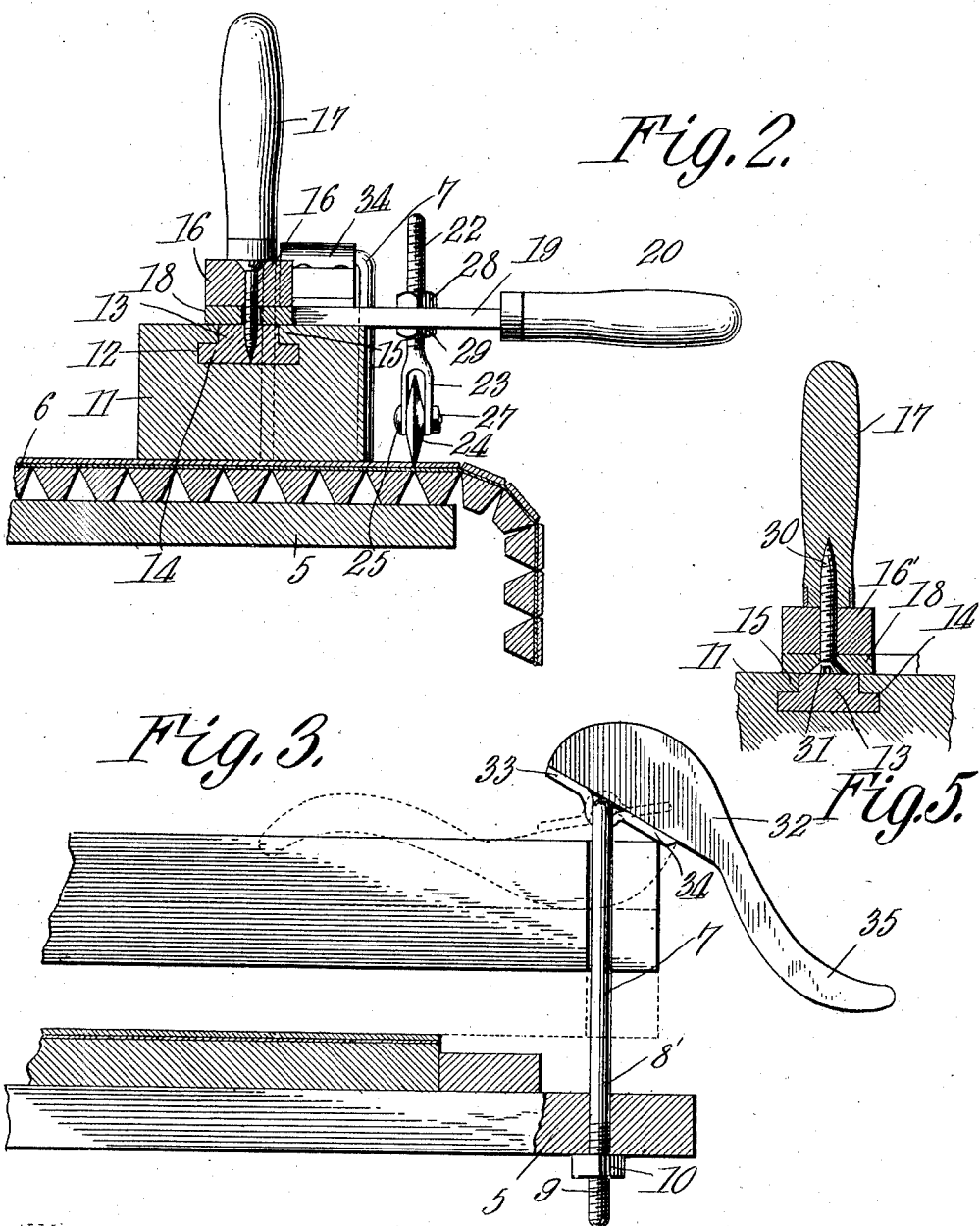

UNITED STATES PATENT OFFICE.

JOHN GRAMELSPACHER, OF JASPER, INDIANA, ASSIGNOR TO JASPER FURNITURE COMPANY, OF JASPER, INDIANA.

MACHINE FOR CUTTING FLEXIBLE ROLL-CURTAINS.

No. 868,656.      Specification of Letters Patent.      Patented Oct. 22, 1907.

Application filed March 11, 1907. Serial No. 361,809.

*To all whom it may concern:*

Be it known that I, JOHN GRAMELSPACHER, a citizen of the United States, residing at Jasper, in the county of Dubois and State of Indiana, have invented a new and useful Machine for Cutting Flexible Roll-Curtains, of which the following is a specification.

This invention relates to machines for gaining or grooving stock used in the manufacture of flexible roll curtains and has for its object to provide a machine having a cutting tool mounted for reciprocation thereon and adapted to cut or groove the veneer face of the curtain stock at the juncture of the transverse reinforcing slats.

A further object of the invention is to provide means for clamping the stock in engagement with a work bench or other suitable support, and means for adjusting the cutter vertically of the clamping means thereby to vary the depth of the crease or groove in the stock.

A further object is to provide a tool-holder having a cutting disk or file mounted thereon and capable of being rotated in the holder so as to expose any particular portion of the disk to the work, and means for locking the disk against rotation.

A still further object of the invention is to generally improve this class of machines so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a flexible roll curtain cutting machine constructed in accordance with my invention. Fig. 2 is a transverse sectional view of the same. Fig. 3 is a side elevation of a portion of the machine showing the clamping member in elevated position. Fig. 4 is a side elevation of the cutting disk or file. Fig. 5 is a vertical sectional view showing the manner of attaching the handle to the sliding block.

Similar numerals of reference indicate corresponding parts in all of the figures of the drawings.

The machine forming the subject matter of the present invention is preferably mounted on a table or work bench 5 which also constitutes a support for the curtain stock 6, the latter being formed of a plurality of transverse slats secured to a strip of flexible material such as duck, canvas or the like and covered by a veneer 8, these parts being preferably glued together in an ordinary press so as to form a stiff continuous length of stock.

Secured to the opposite ends of the table or bench 5 are vertically disposed loops or yokes 7, each provided with a threaded extension or shank 8' which passes through a correspondingly shaped opening formed in the bottom of the table 5 and is provided with terminal threads 9 for engagement with a clamping nut 10 whereby the yokes are rigidly secured in position on the table.

Slidably mounted for vertical movement between the yokes 7 is a longitudinal clamping member or bar 11 having a guiding groove 12 formed therein for the reception of a slide, or block 13, the latter being provided with laterally extending flanges 14 which engage inwardly extending locking lips 15 formed on the bar 11 so as to prevent accidental displacement of the block or slide. Secured to the block or slide 13 in any suitable manner as by screws or similar fastening devices 16 is a short strip or bar 16' to which is secured a vertically disposed handle 17 by means of which the clamping bar 11 may be elevated out of engagement with the stock 6 when it is desired to position the latter on or remove the stock from the table. Interposed between the block 13 and the bar 16' is a metal plate 18 provided with a lateral extension or arm 19 terminating in a handle 20 preferably disposed at right angles to the handle 17 and extended laterally beyond the adjacent longitudinal edge of the clamping member, as shown.

The arm 19 is provided with a plurality of spaced openings 21 in one of which is threaded a vertically adjustable rod or tool-holder 22, the latter having its lower end bifurcated to form parallel arms 23 carrying a cutting tool or disk 24.

The cutting disk 24 is mounted for rotation on a transverse pin 25 extending transversely through the arms 23 and is provided with a plurality of roughened or file surfaces 26 adapted to engage the stock, said disk or file being locked against accidental rotation by means of a clamping nut 27 which engages the threaded end of the pin 25, as shown.

The tool-holder 22 is adjustable vertically of the clamping member 11 so as to vary the depth or cut of the file 24, said tool-holder being locked in adjustable position by means of suitable clamping nuts 28 and 29 which engage the opposite flat faces of the arm 19.

The lifting handle 17 is secured in position on the sliding block 13 by means of a screw or pin 30, one end of which is threaded in said handle while the opposite end thereof is provided with an enlarged head 31 which engages a counter sunk portion in the bottom of the plate 18. It will thus be seen that the head of the screw 30 by engagement with the adjacent surface of the slide or block 13 is effectually locked against accidental displacement, while the head of the screw is free to rotate in the counter sunk portion of the plate 18 thus allowing a corresponding rotary movement of the handle 17.

Pivotally mounted on the upper ends of the yokes or loops 7 are cam levers 32 each having a plate 33 secured thereto and formed with a transverse eye 34 for the reception of the adjacent yoke or loop thus forming a pivotal connection between the levers and yoke and permitting said levers to be swung laterally to operative or inoperative position. The levers 32 are each provided with a terminal operating handle 35 having its intermediate portion bowed upwardly, as indicated at 36 so as to permit the arm 19 to pass beneath the same when the cutter is moved over the face of the stock.

The opposite ends of the clamping member or bar 11 are provided with vertical slots 37 which intersect the guiding groove 12 and form pockets for the reception of the yokes or loops 7 so that when the levers 32 are moved to operative position the clamping bar 11 will be forced downwardly into engagement with the work.

In using the device the clamping bar 11 is moved to elevated position by exerting an upward pull on the lifting lever 17 after which the rigid length of stock from the glue press is placed in position on the table with one longitudinal edge thereof in engagement with the stop flange 37'. The stock is then moved longitudinally of the table until the cutter or disk 24 is in alinement with the meeting faces of two of the transverse slats of the stock, after which the clamping member is moved to lowered position and the levers 32 swung laterally into engagement with the clamping bar thus securely clamping the stock in position on the table. The cutter or disk 24 is moved transversely across the face of the stock by grasping the handles 17 and 20 so as to form a groove or crease at the abutting faces of the adjacent slats. After the first groove has been formed the clamping levers 32 are released and the stock adjusted longitudinally of the table until the cutter is disposed in alinement with the meeting faces of the next two transverse slats and the cutter again moved transversely across the stock, this operation being continued until a groove or incision is made in the veneer at the juncture of the several slats, thus forming a continuous flexible strip constituting the curtain. When one of the faces 26 of the disk or cutter becomes worn a new face may be exposed to the work by rotating said disk and clamping the same against movement by tightening the nut 27.

From the foregoing description it is thought that the construction and operation of the device will be readily understood by those skilled in the art and further description thereof is deemed unnecessary.

Having thus described the invention what is claimed is:

1. The combination with a support, a clamping member mounted for vertical movement on the support and adapted to engage the stock, said clamping member being provided with a longitudinal guide groove, a block slidably mounted in said groove, an arm extending laterally from the block and provided with spaced perforations, a vertically adjustable tool-holder having a threaded shank extending through one of the perforations in the arm, a cutting tool mounted in the holder, clamping nuts engaging the threads above and below the arm and bearing against the latter, and handles carried by the block and arm, respectively, for moving the cutting tool transversely across the face of the stock.

2. The combination with a support, spaced yokes mounted on the support and provided with threaded shanks projecting through the support, clamping nuts engaging the threads on the shanks and bearing against the adjacent face of the support, a clamping bar mounted for vertical movement in the yokes and provided with a longitudinal guiding groove, cam levers pivotally mounted on the yokes and adapted to engage the clamping bar for clamping the latter in engagement with the stock, plates secured to the cam levers and provided with transverse depressions for the reception of the yokes, a block slidably mounted in the guide groove, an arm secured to and extended laterally from the block, and a cutting tool depending from the arm and movable transversely across the face of the stock.

3. The combination with a support, yokes secured to the support, a clamping member mounted for vertical movement between the yokes and adapted to engage the stock, said clamping member being provided with an under cut groove forming a guide, a block slidably mounted in the groove, a bar secured to the block and provided with an operating handle, a plate interposed between the bar and block and having a laterally extending perforated arm terminating in a handle, a threaded rod engaging one of the openings in the bar and having its lower end bifurcated, a circular file mounted in the bifurcated end of the rod and movable transversely across the face of the stock, and clamping nuts threaded on the rod and bearing against the opposite faces of the bar.

In testimony that I claim the foregoing as my own, I have hereto affixed my signature in the presence of two witnesses.

JOHN GRAMELSPACHER.

Witnesses:
HENRY A. ROELLE,
FRANK J. DUPPS.